(12) United States Patent
Chen et al.

(10) Patent No.: US 8,873,012 B2
(45) Date of Patent: Oct. 28, 2014

(54) LIQUID CRYSTAL DISPLAY PANEL AND LIQUID CRYSTAL DISPLAY DEVICE USING THE SAME

(71) Applicant: Innolux Corporation, Miao-Li County (TW)

(72) Inventors: Chien Hung Chen, Tainan County (TW); Ching Che Yang, Tainan County (TW)

(73) Assignee: Innolux Corporation, Miao-Li County (TW)

( * ) Notice: Subject to any disclaimer, the term of this patent is extended or adjusted under 35 U.S.C. 154(b) by 0 days.

(21) Appl. No.: 13/889,724

(22) Filed: May 8, 2013

(65) Prior Publication Data

US 2013/0242248 A1    Sep. 19, 2013

Related U.S. Application Data

(62) Division of application No. 12/963,860, filed on Dec. 9, 2010, now Pat. No. 8,462,304.

(30) Foreign Application Priority Data

Dec. 25, 2009    (TW) .............................. 98145117 A

(51) Int. Cl.
  *G02F 1/1343*    (2006.01)
  *G02F 1/1337*    (2006.01)
(52) U.S. Cl.
  CPC .... *G02F 1/134336* (2013.01); *G02F 1/133707* (2013.01); *G02F 1/134309* (2013.01); *G02F 2001/134345* (2013.01)
  USPC ........................................................ 349/143
(58) Field of Classification Search
  USPC ........................................................ 349/146
  See application file for complete search history.

(56) References Cited

U.S. PATENT DOCUMENTS

| 6,940,575 B2 | 9/2005 | Sunohara et al. |
| 8,395,743 B2 * | 3/2013 | Kim et al. ..................... 349/146 |
| 8,462,304 B2 | 6/2013 | Chen et al. |
| 2009/0046233 A1 | 2/2009 | Cho et al. |

FOREIGN PATENT DOCUMENTS

| CN | 1452003 A | 10/2003 |
| CN | 1909236 A | 2/2007 |
| JP | 2004037854 A | 2/2004 |

OTHER PUBLICATIONS

Office Action issued by Taiwan IPO on Dec. 14, 2012.
Office Action issued by USPTO on Jun. 16, 2014 for U.S. Appl. No. 14/177,247.
Office Action issued by USPTO on Jul. 2, 2014 for U.S. Appl. No. 14/275,970.

\* cited by examiner

*Primary Examiner* — Richard Kim
(74) *Attorney, Agent, or Firm* — Rabin & Berdo, P.C.

(57) ABSTRACT

A liquid crystal display panel includes a first substrate, a second substrate, a liquid crystal layer and an electrode structure. The second substrate is parallel to the first substrate. The liquid crystal layer is located between the first substrate and the second substrate. The electrode structure is disposed on the first substrate. The electrode structure includes a first branch portion and a second branch portion. The first branch portion includes first branch electrodes. The two adjacent first branch electrodes are parallel to each other and separated apart by a first interval. The second branch portion includes second branch electrodes. The two adjacent second branch electrodes are parallel to each other and separated apart by a second interval. Any first branch electrode corresponds to at least part of one of the second intervals. Any second branch electrode corresponds to at least part of one of the first intervals.

2 Claims, 7 Drawing Sheets

LIQUID CRYSTAL DISPLAY PANEL AND LIQUID CRYSTAL DISPLAY DEVICE USING THE SAME

CROSS REFERENCE TO RELATED APPLICATIONS

This application is a Divisional application of co-pending U.S. patent application Ser. No. 12/963,860, filed Dec. 9, 2010 and entitled "LIQUID CRYSTAL DISPLAY PANEL AND LIQUID CRYSTAL DISPLAY DEVICE USING THE SAME". This application claims the benefit of Taiwan application Serial No. 98145117, filed Dec. 25, 2009, the subject matter of which is incorporated herein by reference.

BACKGROUND OF THE INVENTION

1. Field of the Invention

The invention relates in general to a liquid crystal display panel and a liquid crystal display device using the same, and more particularly to a multi-domain liquid crystal display panel and a liquid crystal display device using the same.

2. Description of the Related Art

In recent years, display technology has gained significant progress, and the market demand for liquid crystal display is booming. The display quality of a liquid crystal display is essential in the display industry. Currently, wide angle technology has gradually become an important factor in the quality assessment of the liquid crystal display. In the wide angle technology, multi-domain vertical alignment (MVA) technology attracts more and more interest.

In general, the liquid crystal display includes two polarizers, a liquid crystal display panel and a backlight module. The backlight module is used for providing a light source to the liquid crystal display panel, and the liquid crystal display panel is disposed between the two polarizers. The liquid crystal display panel includes two substrates and a liquid crystal layer which is disposed between the two substrates. Several pixel electrodes are disposed on one of the substrates. To provide multi domains, the pixel electrodes are patterned and divided into regions. Here, the pixel electrode includes two symmetric sub-electrode structures, for example. Each sub-electrode structure includes a stem electrode and several branch electrodes. The branch electrodes are symmetrically connected to the stem electrode.

Referring to FIG. 1, a partial diagram of the liquid crystal pointing arrows corresponding to the liquid crystal layer of a pixel electrode is shown. When a voltage is applied to the pixel electrode, the electrical field changes the directions of the liquid crystal pointing arrows, as indicated in the region A1 at the junction between two sub-electrode structures in FIG. 1. When the directions of the liquid crystal pointing arrows in the region A1 are chaotic to form nodes, streaks will occur to the display frame of the liquid crystal display panel. Therefore, the brightness of the liquid crystal display panel will be decreased during display. Or, the brightness of the liquid crystal display panel may become inconsistent during the display of frames so as to deteriorate the display quality. Besides, the generation of streaks normally increases the time for the liquid crystal display panel to resume the stable state. As a result, how to provide a liquid crystal display with excellent display quality has become an imminent task for the industries.

SUMMARY OF THE INVENTION

The invention is directed to a liquid crystal display panel and a liquid crystal display device using the same, which reduce the occurrence of streaks, increase the brightness and shorten the time for resuming the stable state so as to improve the display quality and product competitiveness.

According to a first aspect of the present invention, a liquid crystal display panel including a first substrate, a second substrate, a liquid crystal layer and an electrode structure is provided. The second substrate is substantially parallel to the first substrate. The liquid crystal layer is located between the first substrate and the second substrate. The electrode structure is disposed on the first substrate. The electrode structure includes a first branch portion and a second branch portion. The first branch portion includes several first branch electrodes. The two adjacent first branch electrodes are substantially parallel to each other and separated apart by a first interval. The second branch portion includes several second branch electrodes. The two adjacent second branch electrodes are substantially parallel to each other and separated apart by a second interval. Any of the first branch electrodes corresponds to at least part of one of the second intervals. Any of the second branch electrodes corresponds to at least part of one of the first intervals.

According to a second aspect of the present invention, a liquid crystal display device including a liquid crystal display panel and a backlight module is provided. The backlight module is used for providing light to the liquid crystal display panel to display an image. The liquid crystal display panel includes a first substrate, a second substrate, a liquid crystal layer and an electrode structure. The second substrate is substantially parallel to the first substrate. The liquid crystal layer is located between the first substrate and the second substrate. The electrode structure is disposed on the first substrate. The electrode structure includes a first branch portion and a second branch portion. The first branch portion includes several first branch electrodes. The two adjacent first branch electrodes are substantially parallel to each other and separated apart by a first interval. The second branch portion includes several second branch electrodes. The two adjacent second branch electrodes are substantially parallel to each other and separated apart by a second interval. Any of the first branch electrodes corresponds to at least part of one of the second intervals, and any of the second branch electrodes corresponds to at least part of one of the first intervals.

The above and other aspects of the invention will become better understood with regard to the following detailed description of the preferred but non-limiting embodiment(s). The following description is made with reference to the accompanying drawings.

DETAILED DESCRIPTION OF THE INVENTION

The liquid crystal display panel and the liquid crystal display device using the same disclosed in the invention are elaboration in a number of embodiments below with accompanying drawings. However, anyone who is skilled in the art of the invention will understand that these drawings and disclosures are for elaboration purpose only, not for limiting the scope of protection of the invention.

First Embodiment

Figure 2A:
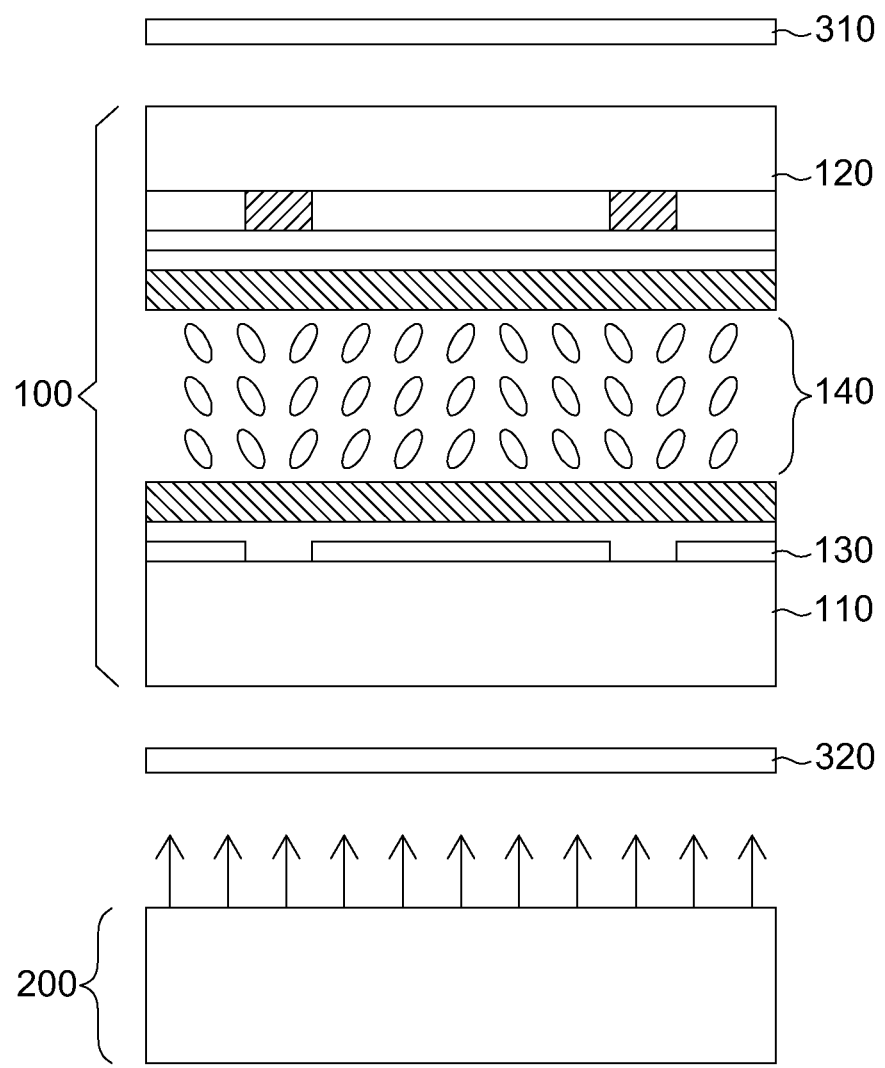
FIG. 2A shows a liquid crystal display device according to a first embodiment of the invention.

Referring to FIG. 2A, a liquid crystal display device according to a first embodiment of the invention is shown. The liquid crystal display device includes a liquid crystal display panel 100, a backlight module 200 and polarizers 310 and 320. The absorption axes of the polarizers 310 and 320 are perpendicular to each other. The liquid crystal display panel 100 is disposed between the polarizers 310 and 320. The backlight module 200 is used for providing light for the liquid crystal display panel 100 to display an image.

The liquid crystal display panel 100 includes a first substrate 110, a second substrate 120, an electrode structure 130 and a liquid crystal layer 140. The second substrate 120 is substantially parallel to the first substrate 110. The liquid crystal layer 140 is located between the first substrate 110 and the second substrate 120. The electrode structure 130 is disposed on the first substrate 110.

Figure 2B:
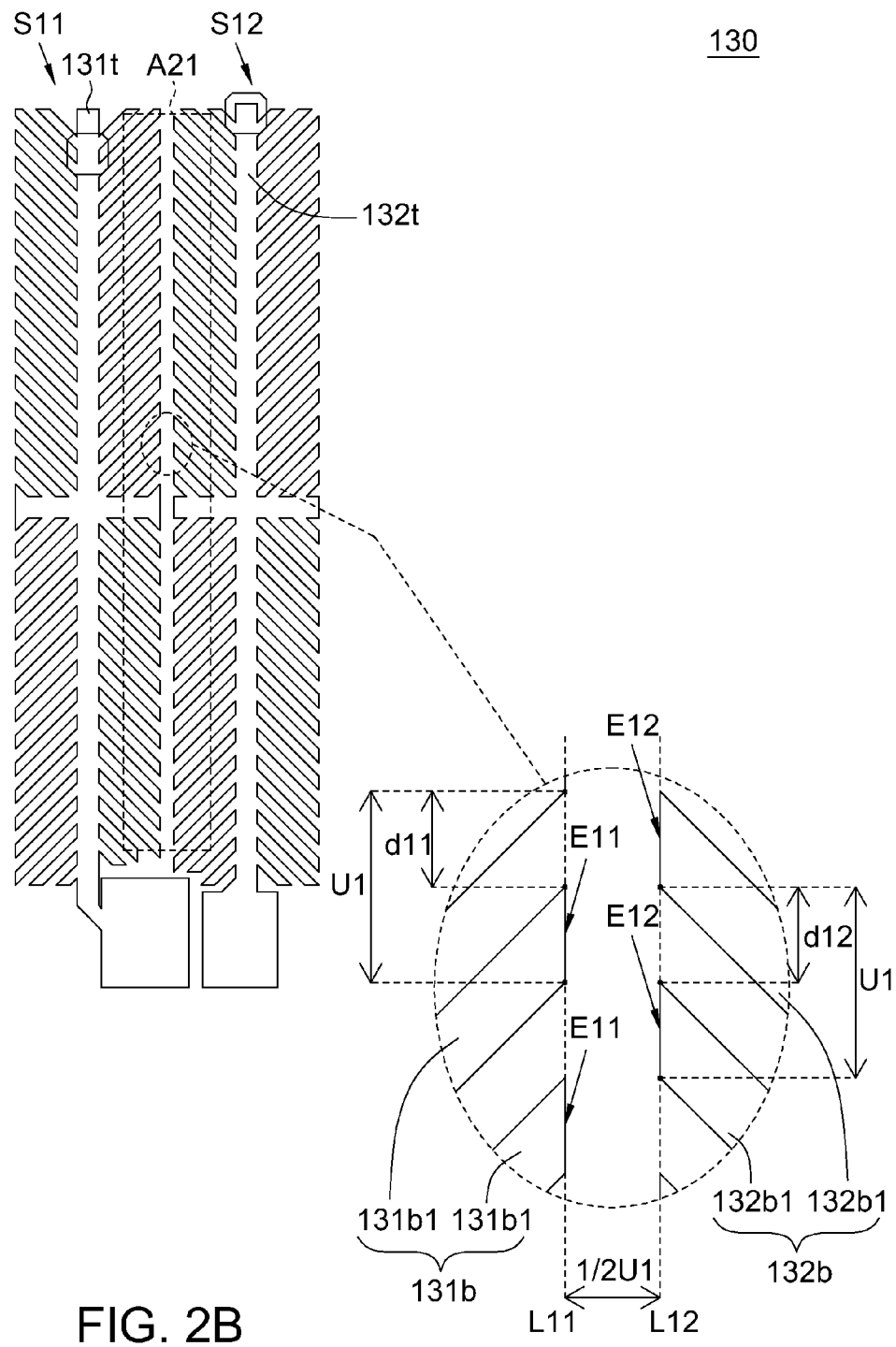
FIG. 2B shows an electrode structure in FIG. 2A.

Referring to FIG. 2B, an electrode structure 130 in FIG. 2A is shown. The electrode structure 130 includes a first stem electrode 131t, a first branch portion 131b, a second stem electrode 132t and a second branch portion 132b. Let the first stem electrode 131t and the first branch portion 131b be viewed as a sub-electrode structure S11, and the second stem electrode 132t and the second branch portion 132b be viewed as a sub-electrode structure S12, the sub-electrode structures S11 and S12 are horizontally adjacent to each other and can respectively be viewed as a first bright region and a second bright region. When an image is displayed, the first bright region and the second bright region can be mixed and displayed in a pixel to produce low color shift effect. Thus, the display quality of the liquid crystal display panel 100 is even more dedicated.

The first stem electrode 131t is, for example, cross-shaped, and the first branch portion 131b includes several first branch electrodes 131b1. The first branch electrodes 131b1 are connected to the first stem electrode 131t. The two adjacent first branch electrodes 131b1 are substantially parallel to each other and separated apart by a first interval d11. Besides, the second stem electrode 132t is, for example, cross-shaped, and the second branch portion 132b includes several second branch electrodes 132b1. The second branch electrodes 132b1 are connected to the second stem electrode 132t. The two adjacent second branch electrodes 132b1 are substantially parallel to each other and separated apart by a second interval d12. Any of the first branch electrodes 131b1 corresponds to at least part of one of the second intervals d12, and any of the second branch electrodes 132b1 corresponds to at least part of one of the first intervals d11.

In the present embodiment of the invention, the end edge E11 of each first branch electrode 131b1 is located on a first dummy line L11, and the end edge E12 of each second branch electrode 132b1 is located on a second dummy line L12. The first dummy line L11 is substantially parallel to the second dummy line L12. Let the length of one first interval d11 and one first branch electrode 131b1 being on the first dummy line L11 be a unit length U1, and the length of one second interval d12 and one second branch electrodes 132b1 being on the second dummy line L12 be the unit length U1, the first dummy line L11 and the second dummy line L12 are, for example, separated apart by a half of the unit length U1. That is, if the unit length U1 is 10 μm, the first dummy line L11 and the second dummy line L12 are separated apart by 5 μm. Thus, the end edge E11 of any of the first branch electrodes 131b1 exactly corresponds to one of the second intervals d12, and the end edge E12 of any of the second branch electrodes 132b1 exactly corresponds to one of the first intervals d11.

Figure 1:
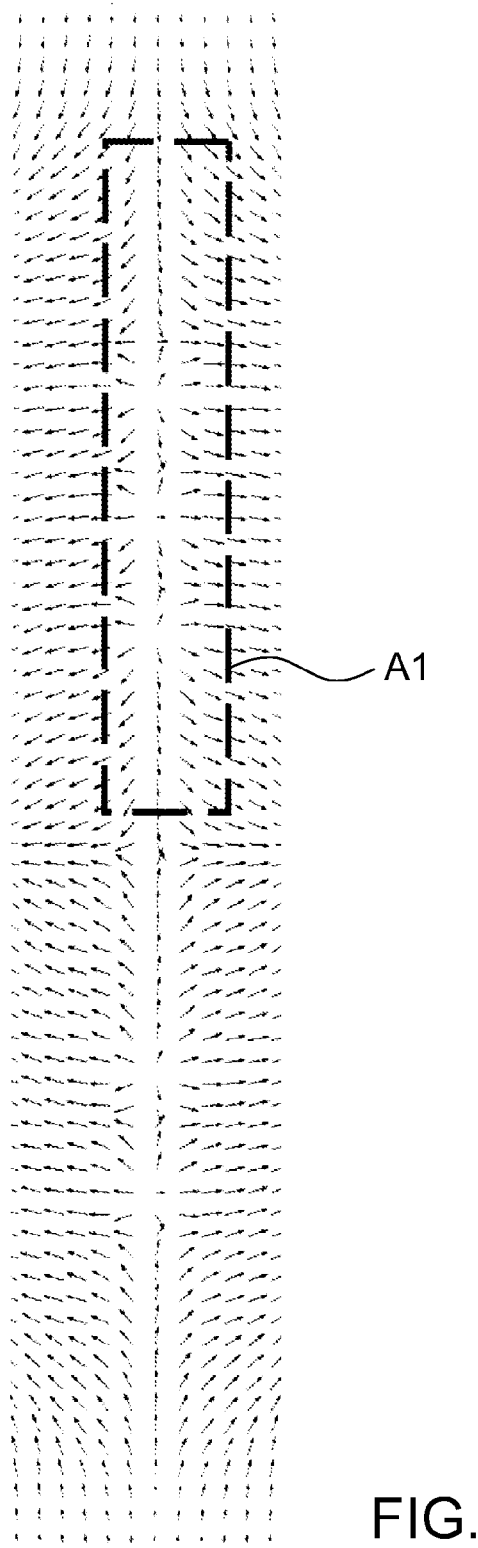
FIG. 1 shows a partial diagram of the liquid crystal pointing arrows corresponding to the liquid crystal layer of a pixel electrode.
Figure 2C:
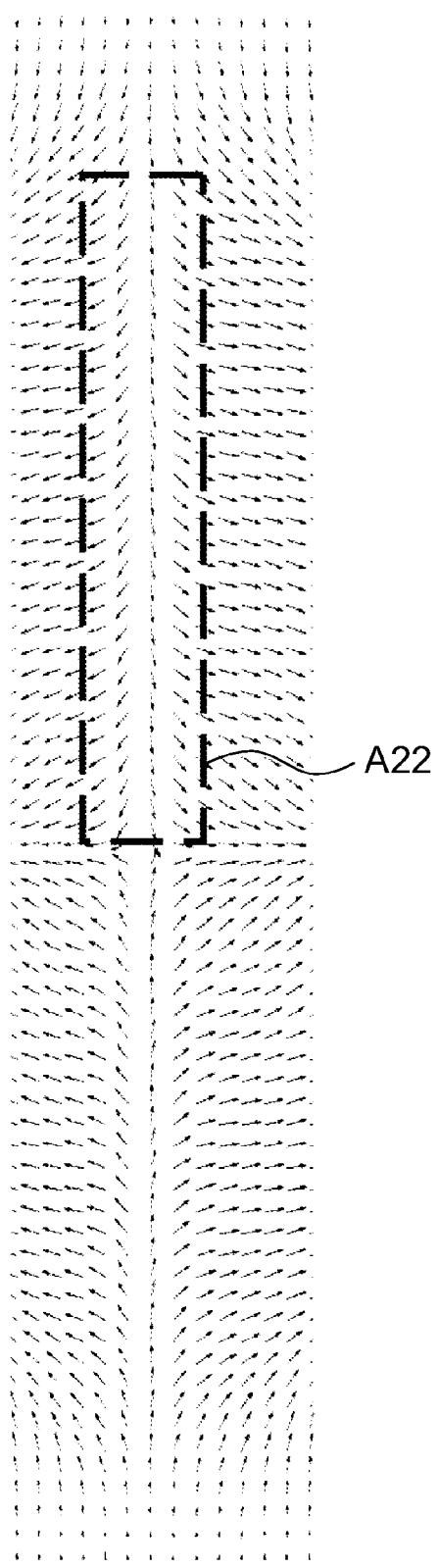
FIG. 2C shows liquid crystal pointing arrows of the liquid crystal layer in FIG. 2A corresponding to a region in FIG. 2B.

Referring to FIG. 2C, liquid crystal pointing arrows of the liquid crystal layer 140 in FIG. 2A corresponding to a region A21 in FIG. 2B are shown. When pixels are switched between the bright state and the dark state, the fringe field at the junction between the first branch portion 131b and the second branch portion 132b guides the liquid crystal molecules to tilt to a consistent direction, as indicated in the region A22. Thus, fewer nodes are generated at the junction between the first branch portion 131b and the second branch portion 132b, so that the liquid crystal display panel 100 has fewer occurrences of streaks and brightness drop. According to the simulation results, if the liquid crystal molecules are distributed as indicated by the liquid crystal pointing arrows in FIG. 1, then the liquid crystal molecules spend about 130 ms to resume the stable state. For the liquid crystal display panel 100 of the present embodiment of the invention, the occurrence of streaks is reduced, and the time for resuming the stable state after the occurrence of streaks is effectively reduced to 20 ms.

In the present embodiment of the invention, the sub-electrode structure S11 and S12 is, for example, disposed in a pixel. However, anyone who is skilled in the technology of the invention will understand that the sub-electrode structure S11 and S12 can also be disposed in two adjacent pixels so as to reduce the occurrence of streaks, increase brightness and shorten the time for resuming the stable state.

Second Embodiment

Figure 3:
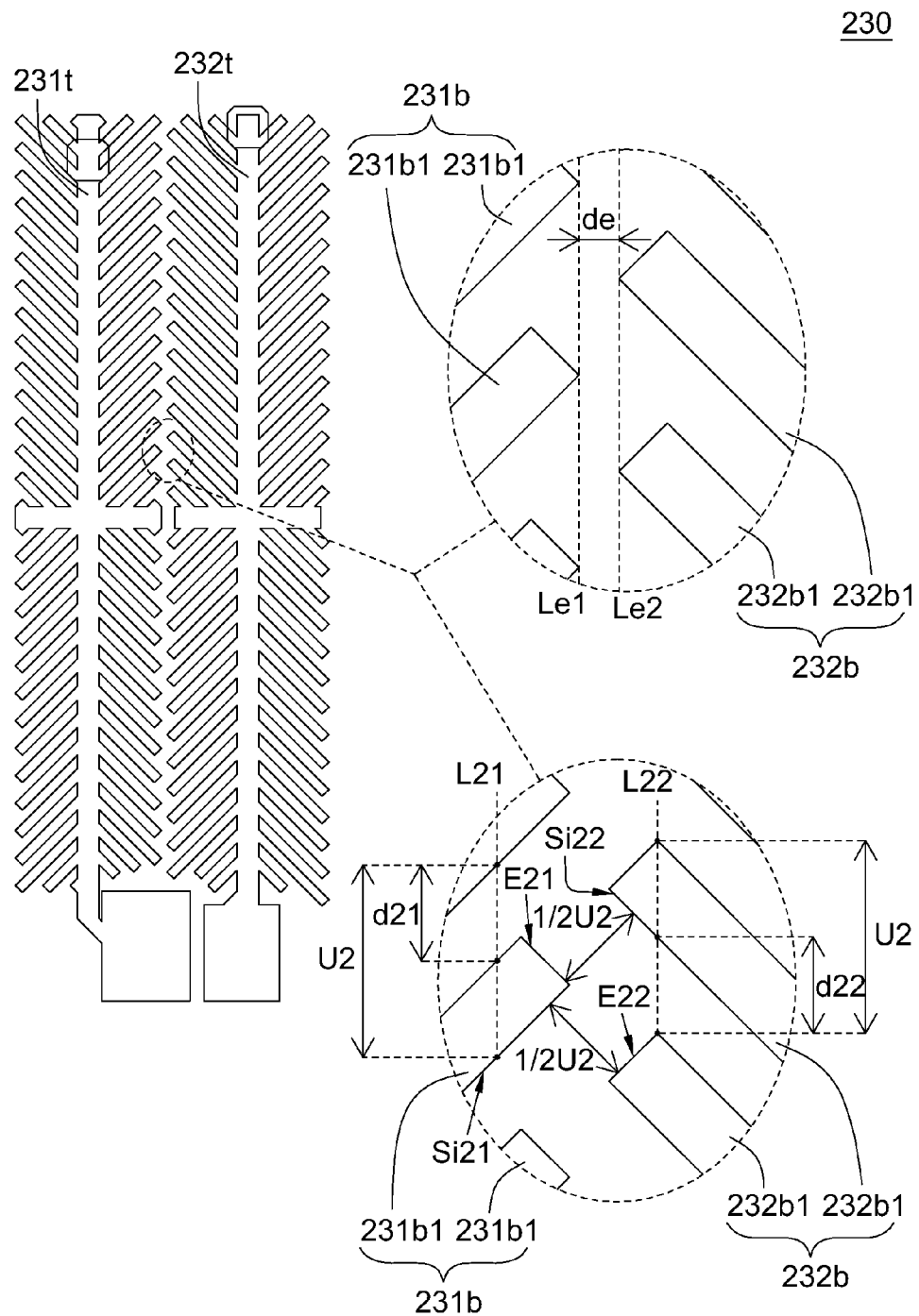
FIG. 3 shows an electrode structure according to a second embodiment of the invention.

Referring to FIG. 3, an electrode structure 230 according to a second embodiment of the invention is shown. A first branch portion 231b of an electrode structure 230 includes several first branch electrodes 231b1. The two adjacent first branch electrodes 231b1 are substantially parallel to each other and separated apart by a first interval d21. A second branch portion 232b of the electrode structure 230 includes several second branch electrodes 232b1. The two adjacent second branch electrodes 232b1 are substantially parallel to each other and separated apart by a second interval d22. In the present embodiment of the invention, any of the second branch electrodes 232b1 corresponds to at least part of one of the first intervals d21, and any of the first branch electrodes 231b1 corresponds to at least part of one of the second intervals d22, so the advantages of the liquid crystal display panel equipped with the electrode structure 230 are similar to that of the liquid crystal display panel 100 of the first embodiment.

In the present embodiment of the invention, one end of each first branch electrode 231b1 is connected to the first stem electrode 231t, and the other end of each first branch electrode 231b1 has two corners formed by an end edge E21 and two sides Si21. The two corners are, for example, 90°. Furthermore, one end of each second branch electrode 232b1 is connected to the second stem electrode 232t, and the other end of each second branch electrode 232b1 has two corners formed by an end edge E22 and two sides Si22. The two corners are, for example, 90°.

Thus, the end edge E21 of any of the first branch electrodes 231b1 corresponds to the side Si22 of one of the second branch electrodes 232b1, and the end edge E22 of any of the second branch electrodes 232b1 corresponds to the side Si21 of one of the first branch electrodes 231b1. Let the length of one first interval d21 and a part of one first branch electrode 231b1 being on a first dummy line L21 be a unit length U2, and the length of one second interval d22 and a part of one second branch electrode 232b1 being on a second dummy line L22 be the unit length U2, the end edge E21 of the first branch electrode 231b1 and the side Si22 of the adjacent second branch electrode 232b1 are separated apart by a half of the unit length U2, and the end edge E22 of the second branch electrode 232b1 and the side Si21 of the adjacent first branch electrode 231b1 are separated apart by a half of the unit length U2, for example. That is, if the unit length U2 is 10 µm, then the end edge E21 of the first branch electrode 231b1 and the side Si22 of the adjacent second branch electrode 232b1 are separated apart by 5 µm, and the end edge E22 of the second branch electrode 232b1 and the side Si21 of the adjacent first branch electrode 231b1 are separated apart by 5 µm. Let the unit length U2 of the present embodiment of the invention be equal to the unit length U1 of the first embodiment. The interval de between a line Le1 formed by several corners of the first branch electrodes 231b1 and a line Le2 formed by several corners of the second branch electrodes 232b1 is smaller than the interval between the first branch electrode 131b1 and the second branch electrode 132b1 of the first embodiment. In other words, as the corners of each first branch electrode 231b1 and the corners of each second branch electrode 232b1 protrude inwardly, the interval de is reduced, so that the width of the corresponding streak is reduced and the display quality is increased.

Third Embodiment

Figure 4:
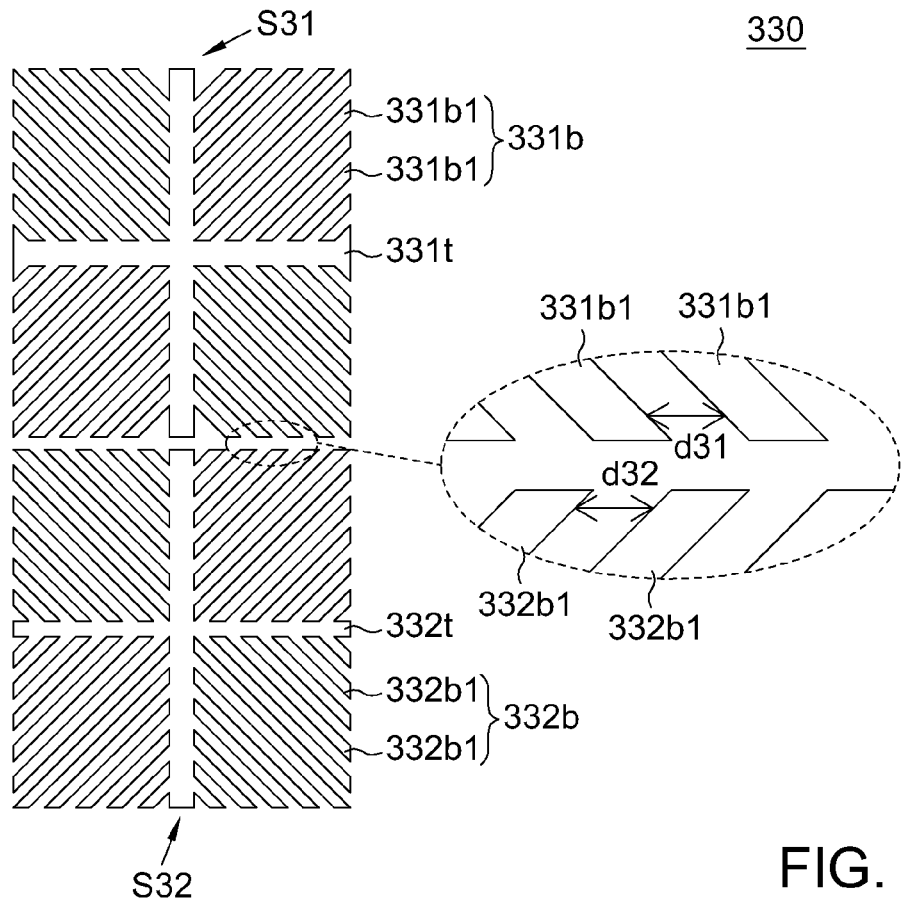
FIG. 4 shows an electrode structure according to a third embodiment of the invention.

Referring to FIG. 4, an electrode structure 330 according to a third embodiment of the invention is shown. The electrode structure 330 includes a sub-electrode structure S31 including a first stem electrode 331t and a first branch portion 331b, and a sub-electrode structure S32 including a second stem electrode 332t and a second branch portion 332b. The sub-electrode structures S31 and S32 are vertically adjacent to each other.

Since any of second branch electrodes 332b1 of the second branch portion 332b corresponds to at least part of one first interval d31, and any of first branch electrodes 331b1 of the first branch portion 331b corresponds to at least part of one second interval d32, the liquid crystal display panel equipped with the electrode structure 330 has similar advantages like the liquid crystal display panel 100 of the first embodiment.

Fourth Embodiment

Figure 5:
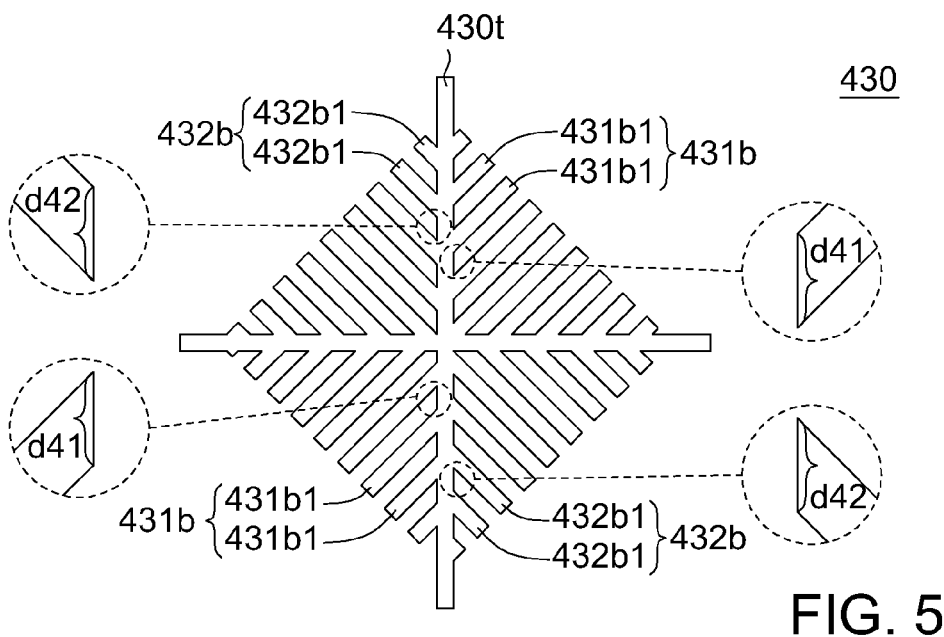
FIG. 5 shows an electrode structure according to a fourth embodiment of the invention.

Referring to FIG. 5, an electrode structure 430 according to a fourth embodiment of the invention is shown. The electrode structure 430 includes a stem electrode 430t, a first branch portion 431b and a second branch portion 432b. The stem electrode 430t is, for example, cross-shaped, and the first branch portion 431b and the second branch portion 432b are respectively connected to two opposite sides of the stem electrode 430t.

Since any of second branch electrodes 432b1 of the second branch portion 432b corresponds to at least part of one first interval d41, and any of first branch electrodes 431b1 of the first branch portion 431b corresponds to at least part of one second interval d42, the liquid crystal display panel equipped with the electrode structure 430 has similar advantages like the liquid crystal display panel 100 of the first embodiment.

Fifth Embodiment

Figure 6:
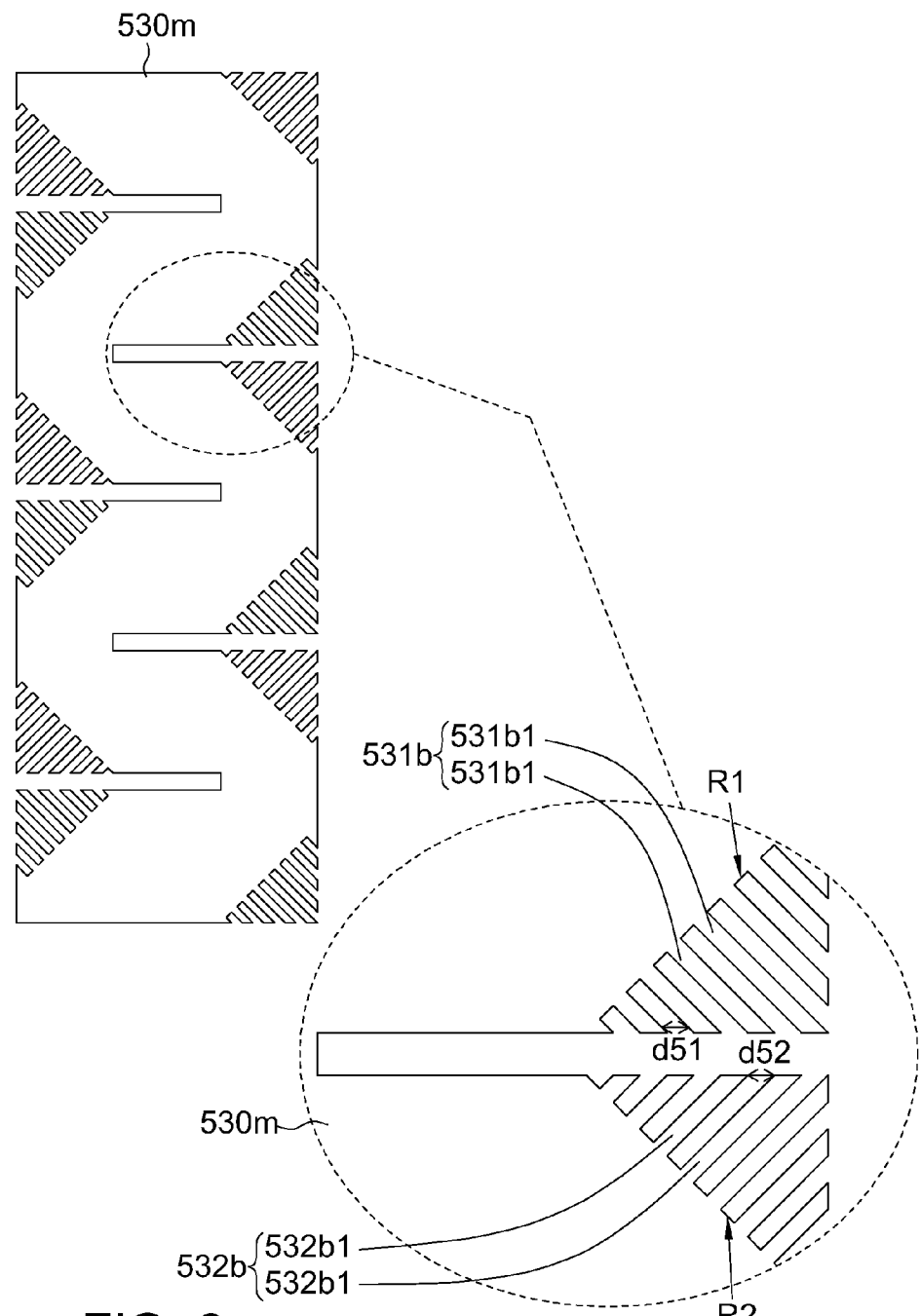
FIG. 6 shows an electrode structure according to a fifth embodiment of the invention.

Referring to FIG. 6, an electrode structure 530 according to a fifth embodiment of the invention is shown. The electrode structure 530 includes a main electrode 530m, a first branch portion 531b and a second branch portion 532b. The main electrode 530m has a first inclined side R1 and a second inclined side R2. The first inclined side R1 and the second inclined side R2 form an indent. Each first branch electrode 531b1 of the first branch portion 531b is connected to the first inclined side R1 to be located inside the indent. Each second branch electrode 532b1 of the second branch portion 532b is connected to the second inclined side R2 to be located inside the indent.

Since any of the second branch electrodes 532b1 corresponds to at least part of one of the first intervals d51, and any of the first branch electrodes 531b1 corresponds to at least part of one of the second intervals d52, the liquid crystal display panel equipped with the electrode structure 530 has similar advantages like the liquid crystal display panel 100 of the first embodiment.

According to the liquid crystal display panel and the liquid crystal display device using the same disclosed in the above embodiments of the invention, through the disposition of the first branch portion and the second branch portion adjacent to each other, the occurrence of nodes at the junction between the first branch portion and the second branch portion can be reduced so as to increase the overall display brightness. Moreover, since the time for resuming the stable state after the occurrence of streaks is shortened, the display quality can be further improved.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:
1. A liquid crystal display panel, comprising:
a first substrate;
a second substrate substantially parallel to the first substrate;
a liquid crystal layer located between the first substrate and the second substrate; and
an electrode structure disposed on the first substrate, wherein the electrode structure comprises:
a first branch portion comprising a plurality of first branch electrodes, wherein the two adjacent first branch electrodes are substantially parallel to each other and separated apart by a first interval;
a second branch portion comprising a plurality of second branch electrodes, wherein the two adjacent second branch electrodes are substantially parallel to each other and separated apart by a second interval, an end edge of each of the first branch electrodes exactly corresponds to one of the second intervals, and an end edge of each of the second branch electrodes exactly corresponds to one of the first intervals; and a main electrode having a first inclined side and a second inclined side, wherein the first inclined side and the second inclined side form an indent, each first branch electrode is connected to the first inclined side to be located inside the indent, and each second branch electrode is connected to the second inclined side to be located inside the indent.

2. A liquid crystal display device, comprising:

a liquid crystal display panel, comprising:

a first substrate;

a second substrate substantially parallel to the first substrate;

a liquid crystal layer located between the first substrate and the second substrate; and an electrode structure disposed on the first substrate, the electrode structure comprises:

a first branch portion comprising a plurality of first branch electrodes, wherein the two adjacent first branch electrodes are substantially parallel to each other and separated apart by a first interval;

a second branch portion comprising a plurality of second branch electrodes, wherein the two adjacent second branch electrodes are substantially parallel to each other and separated apart by a second interval, an end edge of each of the first branch electrodes exactly corresponds to one of the second intervals, and an end edge of each of the second branch electrodes exactly corresponds to one of the first intervals; and a main electrode having a first inclined side and a second inclined side, wherein the first inclined side and the second inclined side form an indent, each first branch electrode is connected to the first inclined side to be located inside the indent, and each second branch electrode is connected to the second inclined side to be located inside the indent; and a backlight module used for providing light to the liquid crystal display panel to display an image.

* * * * *